United States Patent [19]

Maehara

[11] Patent Number: 4,648,565
[45] Date of Patent: Mar. 10, 1987

[54] TAPE CARTRIDGE

[75] Inventor: Yoshimi Maehara, Kyoto, Japan

[73] Assignee: Hitachi Maxell, Ltd., Osaka, Japan

[21] Appl. No.: 713,608

[22] Filed: Mar. 19, 1985

[30] Foreign Application Priority Data

Mar. 19, 1984 [JP] Japan .................................. 59-52945

[51] Int. Cl.$^4$ ...................... G11B 15/22; G11B 23/087
[52] U.S. Cl. .................................................. 242/198
[58] Field of Search .............. 242/198, 199, 200, 197;
352/72, 73, 78 R; 360/92, 93, 96.1, 132; 74/575, 577 R

[56] References Cited

U.S. PATENT DOCUMENTS 4,225,100  9/1980  Sugawara ............................ 242/198
4,447,020  5/1984  Toi et al. .............................. 242/198

Primary Examiner—Stanley N. Gilreath
Attorney, Agent, or Firm—Birch, Stewart, Kolasch & Birch

[57] ABSTRACT

A tape cartridge comprising at least one tape reel having a flange portion provided with a plurality of engaging teeth on the peripheral edge thereof and a rotatable brake arm with the braking end portion thereof formed in a hook shape having a slanted portion so as to engage at a point P with one of the engaging teeth for preventing rotation of the tape reel in such manner that a portion of the slanted wall between the point P and the end of the hook exists inside of or along a locus L which is defined by displacement of the point P of the end portion of the brake arm contacting the corner of the engaged tooth when the braking arm is in a brake position.

2 Claims, 6 Drawing Figures

TAPE CARTRIDGE

FIELD OF THE INVENTION

The present invention relates to a tape cartridge, and more particularly to a tape cartridge having a braking mechanism for applying a braking force to one or more tape reels contained in the cartridge.

BACKGROUND OF THE INVENTION

A conventional braking means for application of braking force to a tape reel in the standard video tape cartridge of the VHS type is shown in FIG. 1. The tape cartridge contains a tape reel 2 having lower flange 2b and an upper flange for winding a recording tape therebetween, a braking arm 14 rotatably supported on a pivotal axis 7 having its free end portion 14a detachably engaged with toothed members 5 formed on the outer peripheral edge of the lower flange 2b and a resilient spring member (not shown) for exerting the braking arm 14 toward the lower flange 2b whereby when not in use, the braking arm 14 is biased toward the tape reel 2 so as to prevent rotation of the tape reel 2 by engagement of the free end portion 14a with one of the engaging teeth 5.

More specifically, when not in use, the end 20 of the braking arm 14 is abutted onto the bottom face 5a of the recessed portion between the two adjacent engaging teeth 5 with the rear surface 21 of the free end portion 14a contacted with the corner 5b of the engaging tooth 5.

In the braking arrangement mentioned above, the tape reel 2 is allowed to be displaced in the radial direction as shown by the phantom lines in FIG. 1 and the braking arm 14 prevents rotation of the tape reel 2 in the direction B for releasing the recording tape thrusting against the engaging tooth 5 of the tape reel. The thrusting force of the braking arm 14 prevents the braking member from releasing from the engagement of the engaging tooth 5. Under such a state, if the tape reel is displaced as shown by the phantom line it makes it difficult for the braking arm 14 to be released from the engaging tooth 5 since the thrusting force applied to the braking arm 14 increases.

Due to the above mentioned problem, the conventional tape cartridge has the disadvantage that when the tape cartridge is mounted on a tape player, a relatively large force is required for releasing the braking arm 14 from the engaging tooth in the direction shown by an arrow Q by a releasing member provided in the tape player, whereby the braking arm 14 tends to fail to disengage from the engaging tooth 5. If such failure occurs, the recording tape can not be drawn from the tape cartridge and the recording tape may be cut or unduly stretched accompanied by damage to the braking member in the worst case. If the worst case does not occur, the braking arm 14 and the related arrangement are subjected to an undesired stress, thereby resulting in damage to the braking arrangement.

SUMMARY OF THE INVENTION

An essential object of the present invention is to provide a tape cartridge comprising a tape reel braking arrangement which can be reliably released from an engaged position by a reduced force.

Another object of the present invention is to provide a tape cartridge comprising a tape reel braking arrangement in which the release operation can be made without an undesired stress being applied to the braking arrangement.

According to the present invention, there is provided a tape cartridge comprising at least one tape reel having a flange portion provided with a plurality of engaging teeth on the peripheral edge thereof and a brake means having a rotatable brake arm with the end portion thereof formed as a hook shape so as to engage with one of the engaging teeth for preventing rotation of the tape reel, wherein the improvement comprises a slanted wall formed at the end portion of the brake arm in such manner that the slanted wall exists inside of or at least on a locus L circumscribed or defined by displacement of a point P on the end portion of the brake arm where the end contacts the corner of one of the engaging teeth when the braking arm is in a brake position.

DETAILED DESCRIPTION OF A PREFERRED EMBODIMENT

Figure 1:
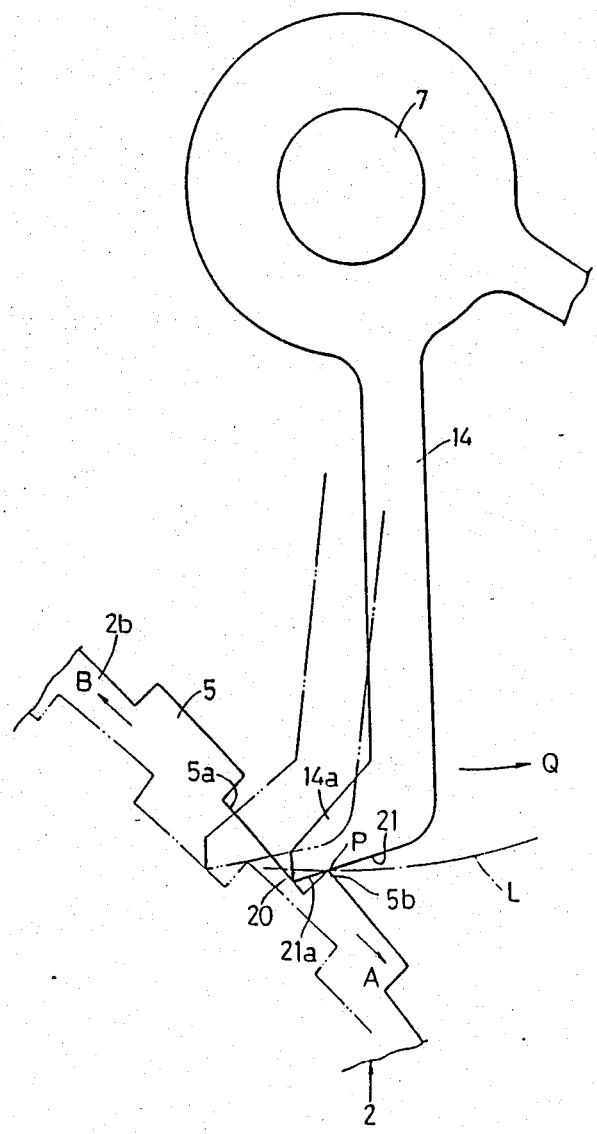
FIG. 1 is a partial plan view showing one example of a braking arrangement used in a conventional tape cartridge.
Figure 2:
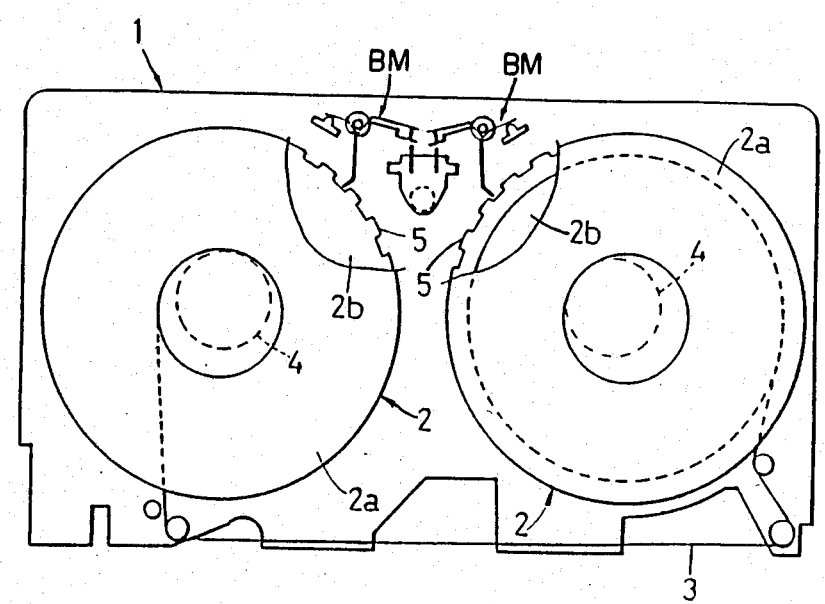
FIG. 2 is a top plan view of a recording tape cartridge according to the present invention with a top half uncovered.

Referring to FIG. 2 showing one example of a video tape cartridge of the VHS type, a case body 1 is formed by combination of a top half 1a and a bottom half 1b each made of plastic resin material and combined together by means of screws. A pair of drive shaft insertion holes 4 are defined on the left and right side portions of the bottom wall of the bottom half 1b. A pair of tape reels 2 are rotatably accommodated in the case body 1 in such a manner that the central portion of each of the tape reels faces to the drive shaft insertion hole 4 with each of the tape reels allowed to move in the radial direction within a predetermined area. Recording tape 3 is wound on the tape reels 2 with both ends fixedly engaged with the cylindrical body portions of the tape reels 2. The recording tape 3 is released from the left side tape reel 2 and drawn to the front portion of the case body 1 and in turn taken up by the right side tape reel 2. As each of the tape reels 2 is moveable in the radial direction, the drive shafts of the tape player can easily be engaged with the hub of the tape reels 2. The tape cartridge may be provided with a movable lid member (not shown) in the front portion of the case body to cover and protect the outer surface of the recording tape 3 in a known manner.

Each of the tape reels 2 comprises a top flange 2a and a bottom flange 2b and a number of engaging teeth 5 having a generally rectangular shape formed on the peripheral edge portion of the bottom flange 2b.

Figure 4:
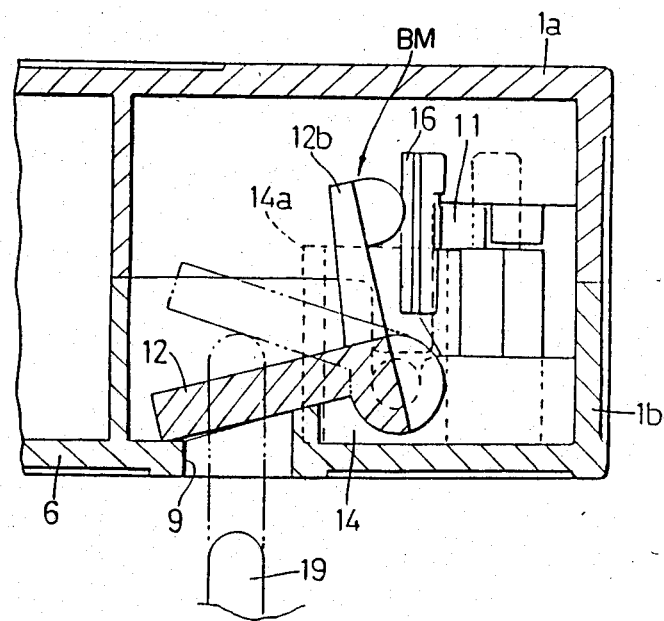
FIG. 4 is a partial cross sectional view taken along the lines IV—IV in FIG. 3.
Figure 3:
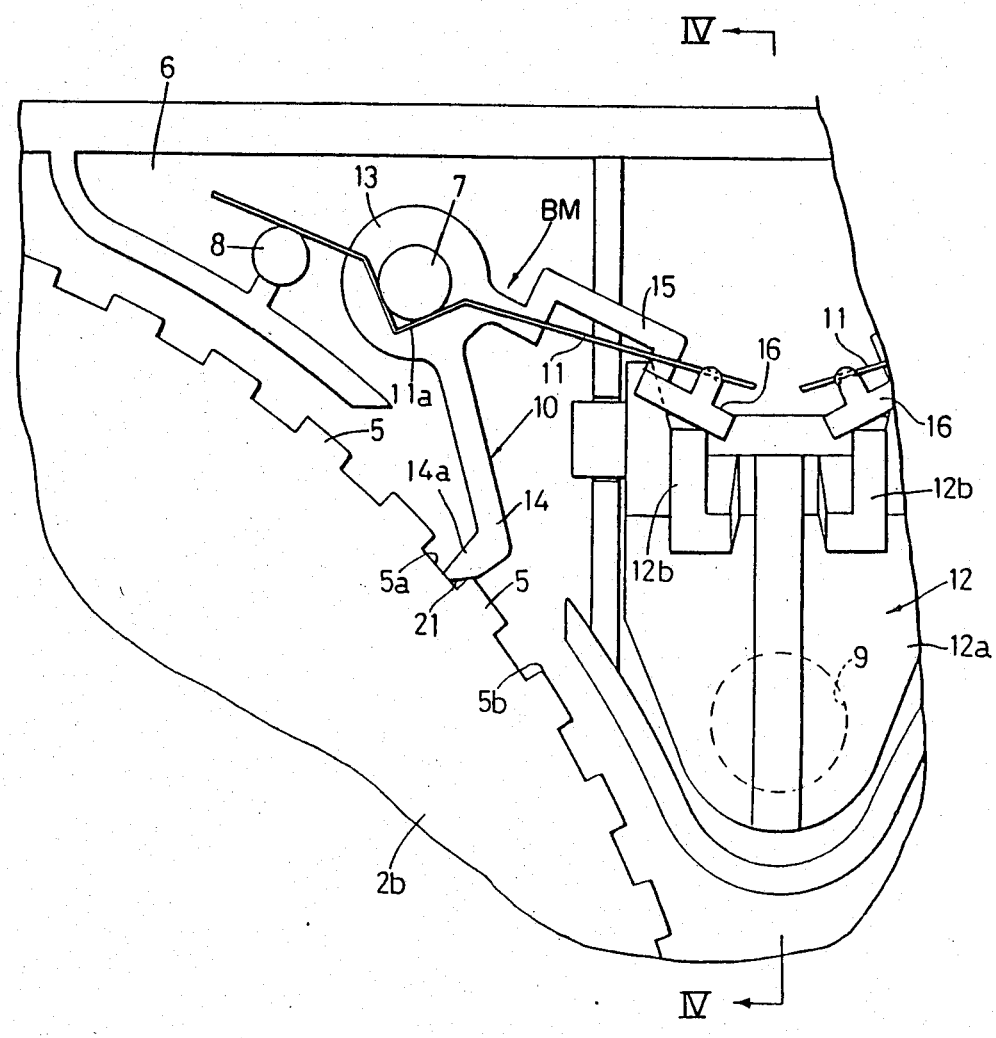
FIG. 3 is a partial top plan view showing an essential portion of a tape reel braking arrangement used in the tape cartridge according to the present invention.
Figure 5:
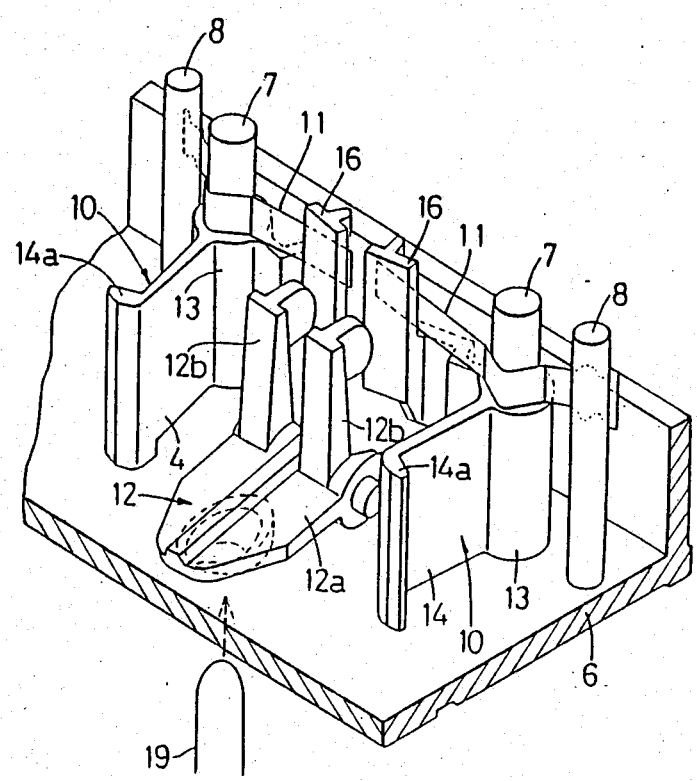
FIG. 5 is a perspective view showing the tape reel braking arrangement shown in FIG. 3.

Referring to FIGS. 3 through 5, a tape reel braking mechanism generally indicated by BM is arranged in a space defined in the rear central portion of the inside of the bottom half 1b. A pair of pivotal axes 7 are projected from the bottom wall of the bottom half 1b and a pair of spring support shafts 8 are projected from the bottom wall adjacent and outside the respective pivotal axes 7. An operation through hole 9 is defined at the central portion between two pivotal axes 7 in the bottom wall of the bottom half 1b. Reel stoppers 10, leaf springs 11 and an operating member 12 are respectively assembled in a manner as described hereinafter.

Each of the reel stoppers 10 is made of plastic resin and has a cylindrical boss 13 at the bottom portion of the stopper with a braking arm 14 and releasing arm 15 projected from the boss 13 which is rotatably engaged with the pivotal axis 7. Each of the leaf springs 11 is formed by an elongated resilient plate with a V shaped bent portion 11a at the intermediate portion thereof. The leaf spring 11 is mounted in a vertical plane the bent portion 11a engaged with the peripheral surface of the pivotal shaft 7, one end portion of the leaf spring plate 11 engaging with support shaft 8 and another end portion with the end portion of the releasing arm 15 of the reel stopper 10. By this arrangement, the leaf spring 11 is resiliently mounted engaged with the pivotal shaft 7, and support shaft 8 with a possible resilient bending, causing the other end portion of the leaf spring 11 to apply a force to rotate the reels stopper 10 towards one of the tape reel 2 so that the engaging end 14a can be exerted for engagement with the engaging tooth 5 of the tape reel.

The operating member 12 comprises a horizontal portion 12a and a pair of vertical portions 12b made of plastic resin. The operating member 12 is movably mounted on the bottom wall of the bottom half 1b to swing vertically so that the horizontal portion 12a closes the operation hole 9 when the operating member 12 is moved down, with the respective vertical portions 12b detachably engaged with both of the operating members 16 of the reel stopper 10 from the front. Thus, each of the reel stoppers 10 is rotated by the resilient force of the leaf springs 11 so that the engaging end 14a of the braking arm 14 can engage with one of the engaging teeth 5 of the tape reel 2 when not in use, thereby preventing rotation of the tape reel 2 in the reverse direction. When the tape cartridge is mounted on the tape player, a pusher pin 19 is inserted in the tape cartridge through the operation hole 9 from below, pushing the operation member 12 upward, whereby the braking arm 14 is rotated in the direction away from the tape reel 2 with the engaging end 14a being disengaged from the engaging tooth 5 to release the tape reel 2 from the braked condition.

The arrangement of the brake mechanism as described above is similar to the brake arrangement of the conventional tape cartridge.

The specific feature of one embodiment of the brake mechanism according to the present invention is described hereinafter.

Figure 6:
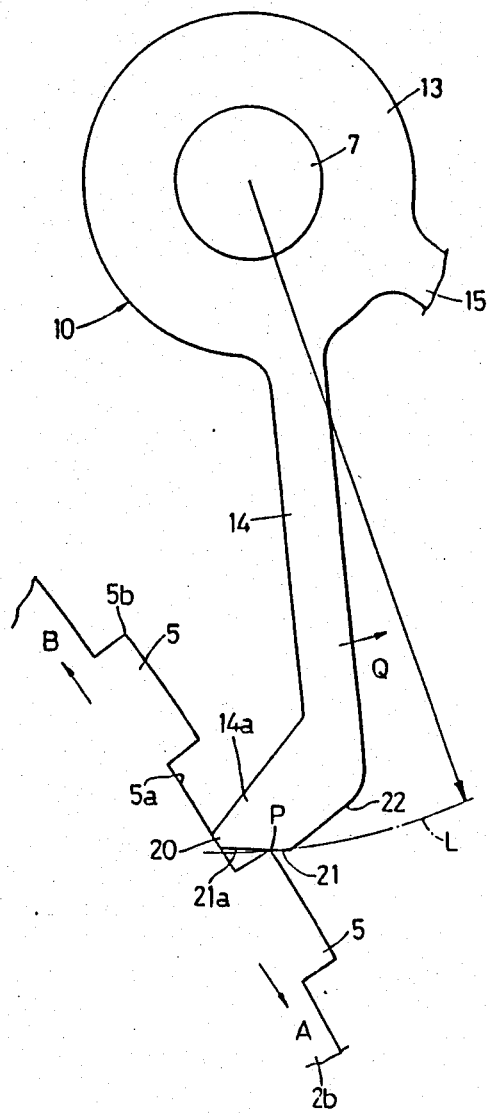
FIG. 6 is a top plan view showing a part of the tape reel braking arrangement according to the present invention.

Referring to FIG. 6, the engaging end 14a of the braking arm 14 is formed in a hook shape with the nose end face 20 directed to the engaging tooth 5 of the tape reel 2, so that the nose end face 20 of the engaging end 14a is kept in contact with the bottom 5a of the recess between the engaging teeth 5 in spite of displacement of the tape reel 2 and the engaging wall 21 formed on the outside faces of the engaging end 14a of the braking arm 14 can be contacted with the corner 5b of the engaging tooth 5 in a point contact (P), thereby allowing the tape reel 2 to rotate in the direction A of taking up the recording tape but preventing the tape reel from rotation in the direction B of releasing the recording tape with the brake arm thrust against the engaging tooth 5.

The point P is the contact point of the outside faces of the engaging end 14a of the braking arm 14 with the corner of the engaging tooth 5 of the tape reel 2 when the braking arm 14 is in the braking position as shown in FIG. 6. An arc L is a locus of the movement of the point P due to rotation of the braking arm 14 around the support axis 7.

According to one embodiment of the present invention, that portion of the slanted wall 21 between the nose end face 20 and the point P on the rear surface of the engaging end 14a, identified as 21a, exists in the inside of the imaginary circle L.

Since the contact point P may change in accordance with the displacement of the tape reel 2 in the radial direction, the total length of the engaging wall 21 is defined longer than an expected distance between the nose end face 20 and the contact point P, which is the furthest position from the nose end face 20. The shape of the hooked portion except for the slanted wall 21 (21a) may be chosen as desired. For example, in the embodiment shown in FIG. 6, the shape of another slanted wall 22 has no specific technical effect, so that the shape of this wall 22 may be chosen as desired.

By the arrangement as described above, when the tape cartridge is not used, the braking arm 14 is located in the position as shown in FIG. 6 and the tape reel 2 is prevented from rotation by the thrust force of the braking arm 14 against the engaging tooth 5.

When the tape cartridge is mounted on the tape player, the braking arm 14 is rotated in the direction Q by the operation of the pusher pin 19, as described above. In this operation, the engaging wall 21 is moved in the direction B contacting the corner 5b of the engaging tooth 5 with the contacting point P moved towards the nose end face 20. Since the slanted wall 21a is inside the arc L, the engaging wall 21 can be easily disengaged from the corner 5b of the engaging tooth 5 by a decreased force for releasing the tape reel from the braked condition.

It is noted that the shape of the slanted wall 21a may be so chosen that the slanted wall is formed nearly along the arc L.

In a case where the slanted wall 21a is formed greatly inwardly from the supposed circle L, the engaging wall 21 may be disengaged from the corner 5b of the engaging tooth 5 when the tape reel 2 is rotated in the releasing direction B by an abnormal strong force. Such configuration of the slanted wall 21a may be included in the scope of the present invention so far as the brake member serves to brake the tape reel under a normal state.

Although the present invention is described with reference to the preferred embodiment, various modification may be made to those skilled in the art without departing from the scope of the invention. For example, in order to rotate the braking arm 14 in the direction Q by the pusher pin 19 of the tape player, a part of the braking arm 14 is opposed to the insertion hole 9 so that the brake arm 14 can be directly driven by the pusher pin 19 introduced in the cartridge case through the insertion hole 9. In this arrangement, the braking arm 14 may be rotatably supported on the pivotal axis 7 by the intermediate portion of the brake arm with one end portion of the brake arm to be engageable with the pusher pin for rotation of the brake arm. On the other hand, the braking arm 14 may be rotatably supported on the pivotal axis by one end portion with the intermediate portion of the brake arm to be engageable with the pusher pin for rotation of the brake arm. Further, the engaging tooth may be formed with a saw tooth shape. In the preferred embodiment described above, the braking mechanism is located in the rear central portion of the case body so that both of the brake arms are operable for the respective tape reels in common, however, the braking mechanism may be separately provided for the respective tape reels in the left side portion and the right side portion of the case body. Furthermore, it may be possible to provide the braking mechanism similar to the embodiment described above for one of the tape reels and to provide another type of brake mechanism for the other tape reel. The leaf springs for exerting the braking arm 14 may be replaced by any other type of resilient means such as torsion spring means or resilient chip members projected from the brake arm for providing the force exerting the brake arm toward the tape reel. Further, the insertion hole 9 may be defined on the side wall of the case body so that the pusher pin of the tape player may enter from the side of the case body to release the brake mechanism.

What is claimed is:

1. A braking mechanism for a tape cartridge comprising:

at least one tape reel provided with a flange having a plurality of engaging teeth consecutively formed on a peripheral edge of said flange, each tooth having at least one corner and being separated from an adjacent tooth by a recess portion, and a rotatable brake arm provided with a hook shaped engaging end having a nose end face and a slanted engaging wall formed on outside faces of said engaging end of said brake arm, such that during braking of said at least one tape reel, said nose end face is kept in contact with a bottom of at least one of said recess portions between respective teeth, and said engaging wall comes into contact with a corner of one of said teeth at a point P such that a portion of said slanted engaging wall between said point P and said nose end face exists on or is inside of a locus circumscribed by the rotation of said point P about an axis of said brake arm.

2. A tape cartridge comprising:

a case;

at least one tape reel provided with a flange contained in said case, said flange having a plurality of engaging teeth consecutively formed on a peripheral edge of said flange, each tooth having at least one corner and being separated from an adjacent tooth by a recess portion; and a rotatable brake arm provided with a hook shaped engaging end having a nose end face and a slanted engaging wall formed on outside faces of said engaging end of said brake arm, such that during braking of said at least one tape reel, said nose end face is kept in contact with a bottom of at least one of said recess portions between respective teeth, and said engaging wall comes into contact with a corner of one of said teeth at a point P such that a portion of said slanted engaging wall between said point P and said nose end face exists on or is inside of a locus circumscribed by the rotation of said point P about an axis of said brake arm.

* * * * *